2,875,125
Patented Feb. 24, 1959

2,875,125

SULFAMOYLANILINOALKANESULFONIC ACID COMPOUNDS

Van R. Gaertner, Dayton, Ohio, assignor to Monsanto Chemical Company, St. Louis, Mo., a corporation of Delaware No Drawing. Application December 22, 1955
Serial No. 554,650

5 Claims. (Cl. 167—33)

This invention relates to new aminobenzenesulfonamide compounds, to the preparation thereof, and to the use of these compounds as fungicides. More particularly, it relates to novel fungicidal sulfamoylanilinoalkanesulfonic acid compounds.

It has been known hitherto to prepare derivatives of aminobenzenesulfonamides by reaction of sulfanilamide and related compounds with aldehydes and an alkali metal bisulfite. The products obtainable by this reaction, regardless of the length of aldehyde chain, are limited to those in which only one carbon atom intervenes between the amide nitrogen atom and a sulfonic acid group. Such compounds are relatively unstable and while valuable for pharmaceutical purposes, are not readily suited to use, e. g., as biological toxicants in agricultural applications requiring stability in storage and under field application conditions. Hydroxyalkanesulfonate salts, such as sodium isethionate, do not react readily with the present sulfonamide compounds under ordinary conditions. Thus, no method has previously been available for the production of a (sulfamoylanilino)alkanesulfonic acid compound wherein the alkane chain separates the amino nitrogen atom and the sulfonic acid group by more than one carbon atom.

It is an object of this invention to provide new plant-protectant compositions. It is a further object of this invention to provide a new method for combating fungus infestations on plants. Another object of this invention is the provision of new sulfamoylanilinoalkanesulfonate compounds wherein the alkane chain separates the amino nitrogen of the anilino radical and the sulfo group by more than one carbon atom. A further object of this invention is the provision of a method for the preparation of these new compounds. These and other objects are attained as described hereinbelow.

The compounds which are the subject of the present invention are prepared by the reaction of an aminobenzenesulfonamide, or derivative thereof, with a sultone, as illustrated by the following equation:

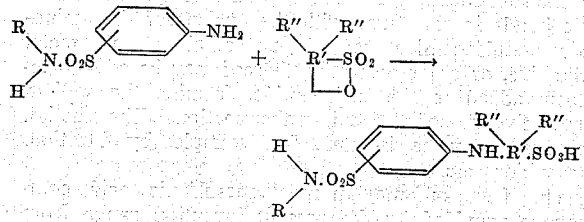

wherein R is selected from the class consisting of hydrogen, hydrocarbon radicals free of non-benzenoid unsaturation and containing from 1 to 10 carbon atoms, and heterocyclic radicals containing a heterocyclic nitrogen atoms containing not more than 2 rings; R' is a saturated straight-chain hydrocarbon radical containing from 3 to 7 carbon atoms; and R'' is selected from the class consisting of hydrogen and hydrocarbon radicals free of non-benzenoid unsaturation and containing from 1 to 10 carbon atoms.

By non-benzenoid unsaturation is here meant carbon-to-carbon olefinic and acetylenic unsaturation.

Aminobenzenesulfonamide compounds of the above formula and useful in the present process include orthanilamide, metanilamide and sulfanilamide and $N^1$-substituted derivatives thereof. As examples of orthanilamide derivatives of the above formula which may be used in preparing the new compounds of the invention may be mentioned hydrocarbon-substituted orthanilamide derivatives such as 2-amino-N-methylbenzenesulfonamide, 2-amino-N-sec-butylbenzenesulfonamide, 2-amino-N-cyclohexylbenzenesulfonamide, 2-amino-N-phenylbenzenesulfonamide, etc., and heterocycle-substituted orthanilamide derivatives such as 2-amino-N-2-pyridylbenzenesulfonamide, 2 - amino - N - 2 - thiazolylbenzenesulfonamide, 2-amino-N-pyrazinylbenzenesulfonamide, 2-amino-N-1,3,4-thiadiazolylbenzenesulfonamide, etc. Examples of metanilamides which may be reacted with sultones in accordance with the present process to produce the new compounds of this invention are $N^1$-hydrocarbon-substituted metanilamides such as $N^1$-ethylmetanilamide, $N^1$-n-propylmetanilamide, $N^1$-(2-ethylhexyl) metanilamide, metanilanilide, $N^1$-benzylmetanilamide, etc. and $N^1$-heterocycle-substituted metanilamides such as $N^1$-2-pyridylmetanilamide, $N^1$-2-quinolylmetanilamide, $N^1$-5-pyrimidylmetanilamide, $N^1$-(4-methyl-2-pyrimidyl)metanilamide, $N^1$-2-quinoxalylmetanilamide, $N^1$-pyrazinylmetanilamide, $N^1$-(1,3,4-thiadiazolyl)metanilamide, etc.

Particularly preferred in the present process are sulfanilamide and derivatives thereof. Examples of sulfanilamide compounds of the above formula which may be reacted with the present sultones in accordance with the process of this invention include hydrocarbon-substituted sulfanilamides such as $N^1$-methylsulfanilamide, $N^1$-ethylsulfanilamide, $N^1$-n-propylsulfanilamide, $N^1$-iso-butylsulfanilamide, $N^1$-amylsulfanilamide, $N^1$-(2-ethylhexyl)sulfanilamide, $N^1$-nonylsulfanilamide, $N^1$-cyclohexylsulfanilamide, sulfanilanilide, $N^1$-benzylsulfanilamide, $N^1$-phenethylsulfanilamide, $N^1$-(4-phenylbutyl)sulfanilamide, $N^1$-p-tolylsulfanilamide, $N^1$-cumylsulfanilamide, $N^1$-2,4-xylylsulfanilamide, etc., and heterocycle-substituted sulfanilamides such as sulfathiazole, sulfapyridine, sulfapyrazine, sulfamerazine, sulfamethazine, sulfadiazine and sulfathiadiazole.

In accordance with the present invention aminobenzenesulfonamides of the above formula are reacted with sultones of the formula:

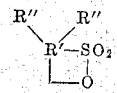

where R' is a saturated straight-chain hydrocarbon radical of from 3 to 7 carbon atoms, and R'' is selected from the class consisting of hydrogen and hydrocarbon radicals free of non-benzenoid unsaturation and containing from 1 to 10 carbon atoms. Sultones are compounds well known in the art and readily preparable by well-known methods. Examples of sultones suitable for use in the present process are the sultone of 4-hydroxy-1-butanesulfonic acid, the sultone of 3-hydroxy-1-butanesulfonic acid, the sultone of 4-hydroxy-2-butanesulfonic acid, the sultone of 3-hydroxy-2-methyl-1-propanesulfonic acid, the sultone of 5-hydroxy-2-pentanesulfonic acid, the sultone of 4-hydroxy-1-pentanesulfonic acid, the sultone of 3-(hydroxymethyl)-1-pentanesulfonic acid, the sultone of 4-hydroxy-2-methyl-1-butanesulfonic acid, the sultone of 3-hydroxy-1-pentanesulfonic acid, the sultone of 4-hydroxy-1-hexanesulfonic acid, the sultone of 5-hydroxy-4-methyl-1-hexanesulfonic acid, the sultone of 6-ethyl-5-hydroxy-2-octadecanesulfonic acid, the sultone of 7,7-dimethyl-4- hydroxy-1-octanesulfonic acid, the sultone of 4-hydroxy-1-hexadecanesulfonic acid, the sultone of 3-hydroxy-2-methyl-3-phenyl-1-propanesulfonic acid, the sultone of 3-cyclohexyl-3-hydroxy-1-propanesulfonic acid, etc.

In addition to pure preparations of individual sultones, also useful in the present process are mixtures of sultones such as are obtained in the technical synthesis of these compounds on a commercial scale; e. g., by the sulfochlorination process. These mixtures of sultones may be designated with reference to the parent hydrocarbon structure without specifying the points of attachment of the hydroxy and sulfonic groups; e. g., propanesultone, butanesultone, kerosenesultone, isodecanesultone, n-hexadecanesultone, and isooctanesultone, etc.

The compounds provided in accordance with the present invention are sulfamoylanilinoalkanesulfonic acids and derivatives thereof. The sulfonic acids formed can be readily converted to the ammonium, alkali metal, or alkaline earth metal salts thereof, by contacting the sulfonic acid with ammonia or basic compounds of the said metals, using conventional procedures for salt formation, and such salts are also contemplated within the scope of the present invention.

It is to be noted that, whereas the products of reaction of sultones and aminobenzenesulfonamide compounds by the present process are formulated herein as sulfonic acids, the alternative salt structure for each of these compounds

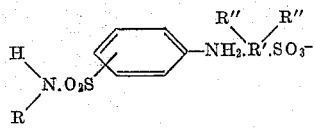

will be readily recognized by those skilled in the art to be the equivalent of the acid structure

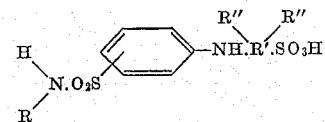

However, for the sake of convenience in referring to the present compounds, the sulfonic acid nomenclature will be used consistently hereinafter.

Examples of the sulfonic acid compounds made available by the present method by the reaction of unsubstituted aminobenzenesulfonamides with the present alkanesultones are; e. g., 3-(o-sulfamoylanilino)-1-propanesulfonic acid, 3-(m-sulfamoylanilino)-1-propanesulfonic acid, 3-(p-sulfamoylanilino)-1-butanesulfonic acid, 3-(p-sulfamoylanilino)-1-butanesulfonic acid, 4-(m-sulfamoylanilino)-1-butanesulfonic acid, 5-(p-sulfamoylanilino)-2-pentanesulfonic acid, 4-(p-sulfamoylanilino)-1-hexadecanesulfonic acid, 2-methyl-3-(p-sulfamoylanilino)-1-propanesulfonic acid, 6-ethyl-5-(p-sulfamoylanilino)-2-octadecanesulfonic acid, 7,7-dimethyl-4-(p-sulfamoylanilino)-1-octanesulfonic acid, 3-cyclohexyl-3-(p-sulfamoylanilino)-1-propanesulfonic acid, 3-phenyl-3-(p-sulfamoylanilino)-1-propanesulfonic acid, etc.

Examples of the products of reaction of sultones and N¹-hydrocarbon-substituted aminobenzenesulfonamides in accordance with the process of the invention are: 3-(p-(methylsulfamoyl)anilino)-1-propanesulfonic acid, 4-(p-(ethylsulfamoyl)anilino)-1-dodecanesulfonic acid, 3-(m-(isopropylsulfamoyl)-anilino)-1-propanesulfonic acid, 4-(p-(sec-butylsulfamoyl)anilino)-1-butanesulfonic acid, 3-(p-(amylsulfamoyl)anilino)-1-butanesulfonic acid, 5-(p-(n-octylsulfamoyl)anilino)-2-pentanesulfonic acid, 3-(p-(isodecylsulfamoyl)anilino)-1-propanesulfonic acid, 3-(p-(phenylsulfamoyl)anilino)-1-propanesulfonic acid, 4-(m-(p-tolylsulfamoyl)anilino)-1-tetradecanesulfonic acid, 3-(p-(cumylsulfamoyl)anilino)-1-propanesulfonic acid, 3-(p-(carvacrylsulfamoyl)-anilino)-1-propanesulfonic acid, 3-(p-(cyclohexylsulfamoyl)anilino)-1-propanesulfonic acid, 4-(p-(benzylsulfamoyl)anilino)-2-pentanesulfonic acid, 4-(p-(phenethylsulfamoyl)anilino)-1-decanesulfonic acid, etc.

Novel products of the above formula which may be prepared by reaction of the present sultones with aminobenzenesulfonamides bearing a nitrogen-containing heterocyclic radical on the amide nitrogen are; e. g., 3-(p-(2-pyrimidylsulfamoyl)anilino)-1-propanesulfonic acid, 3-(p-(2-quinolylsulfamoyl)anilino)-1-propanesulfonic acid, 3-(p-(4,6-dimethyl-2-pyrimidylsulfamoyl)anilino)-1-propanesulfonic acid, 3-(p-(pyrazinylsulfamoyl)anilino)-1-propanesulfonic acid, 3-(m-(2-thiazolylsulfamoyl)anilino)-1-propanesulfonic acid, 3-(p-(1,3,4-thiadiazol-2-ylsulfamoyl)anilino)-1-propanesulfonic acid, 3-(o-(2-pyridylsulfamoyl)anilino)-1-propanesulfonic acid, 4-(p-(2-pyrimidylsulfamoyl)anilino)-1-butanesulfonic acid, 2-methyl-4-(p-(pyrazinylsulfamoyl)anilino)-1-butanesulfonic acid, 2-ethyl-4-(p-(2-thiazolylsulfamoyl)anilino)-1-pentanesulfonic acid, 2-cyclohexyl-4-(p-(2-quinolylsulfamoyl)anilino)-2-pentanesulfonic acid, 4-phenyl-3-(p-(2-thiazolylsulfamoyl)anilino)-1-hexanesulfonic acid, 5-phenethyl-4-(p-(2-pyridylsulfamoyl)anilino)-1-nonanesulfonic acid, 5-amyl-4-(p-(1,3,4-thiadiazol-2-ysulfamoyl)anilino)-1-pentadecanesulfonic acid, 6-ethyl-3-(4-phenylbutyl)-4-(p-(2-thiazolylsulfamoyl)anilino)-1-decanesulfonic acid, 7-isodecyl-4-(p-(2-pyridylsulfamoyl)anilino)-1-heptadecanesulfonic acid, etc.

In preparing the present new aminobenzenesulfonamide derivatives, the aminobenzenesulfonic acid compound is simply contacted with the sultone until reaction is complete. Heat may be applied to accelerate the reaction. Conveniently, the amino compound and the sultone are reacted in solution and heated to the reflux temperature of the mixture, though solvent and diluent can be omitted from the reaction mixture if desired. Temperatures from room temperature up to below the decomposition point of the reaction mixture ingredients may be employed, higher temperatures generally producing shorter reaction times. Suitable solvents are, for example, hydrocarbons such as benzene, toluene and hexane, oxy compounds such as dioxane, 2-butoxyethanol, ethyl alcohol, or water, chlorinated hydrocarbons such as o-dichlorobenzene, etc. As indicated by the equation given above, the reactants in the present process react in stoichiometrically equivalent amounts, and thus suitably equimolecular amounts of the two reaction components are employed in preparing the present compounds. However, an excess of one component, for example, the more readily available compound, may be used if desired, unreacted material being recovered in re-useable form at the end of the reaction. The process of the invention may be carried out either by a batch or a continuous method. If desired, sub- or super-atmospheric pressures may be employed, though I have found ordinary atmospheric pressure satisfactory. Catalysts may or may not be used; thus, for example, in the reaction of sultones with the present aminobenzenesulfonamides wherein the amide nitrogen bears an aromatic substituent, producing a conjugated system of double bonds in resonance with the nucleus of the aminobenzenesulfonamide radical, an alkali metal, metal alkoxide, or other derivative thereof may be advantageously added to the sulfonamide, forming the sodium derivative thereof, to facilitate the reaction. The reaction products may be isolated, for example, by filtration, extraction, etc.

The new sulfamoylanilinoalkanesulfonic acid compounds provided by the present invention range from viscous liquids to solid materials; they are generally stable at room temperature and melt at relatively elevated temperatures with decomposition. The present compounds are useful for a wide variety of agricultural and chemical applications. For example, they may be used in the chemical industry as intermediates in the manufacture of dyes, etc. The present compounds possess biological toxicant properties, and may be used, e. g., as pharmaceuticals and antiseptics, as herbicides, insecticides, nematocides, bacteriostats and bacteriocides, etc. I have discovered that these new compounds possess surprisingly high activity as agricultural fungicides.

The preparation of the present compounds is illustrated by the following non-limiting examples:

Example 1

A solution of 8.6 grams of sulfanilamide (0.05 mole) in 100 ml. of hot ethanol was placed in a flask to which was added 6.1 grams of γ-propanesultone (0.05 mole). The homogeneous solution formed was stirred and refluxed for 5 hours, and then cooled with stirring and filtered. The solid collected on the filter was washed with ethanol and dried, giving 8.7 grams of product. Concentration of the filtrate gave an additional 0.8 grams (total 9.6 grams=64.5% yield) of 3-(p-sulfamoylanilino)-1-propane sulfonic acid, which sinters at 170° and decomposes at 210° C. A sample dried overnight at 56° under a low vacuum was found on analysis to contain 8.64% nitrogen.

Example 2

A solution of 12.7 grams (0.05 mole) of sulfathiazole in 100 ml. of ethanol was mixed with 6.1 grams of γ-propanesultone and refluxed for 4 hours. The white, water-soluble precipitate formed was filtered off at about 90° C. and washed 3 times with ethanol, yielding 8.0 grams of dry, yellowish 3-(p-(thiazolylsulfamoyl)anilino)-1-propanesulfonic acid. A sample recrystallized from aqueous ethanol and then from water formed white needles, M. 193–196° (forming a gel), with the following composition:

|   | Calcd. | Found |
|---|---|---|
| C | 38.1 | 36.6 |
| H | 4.00 | 4.37 |
| N | 11.1 | 10.7 |

Similarly, by the reaction of $N^1$-2-pyridylmetanilamide with the sultone of 4-hydroxy-1-hexadecanesulfonic acid, there is prepared 4-(m-(2-pyridylsulfamoyl)anilino)-1-hexadecanesulfonic acid.

Example 3

Sulfanilanilide (12.4 g.) (0.05 mole) was added to a solution of 1.2 g. of sodium in 100 ml. of absolute ethanol and heat was applied until the clear solution began to deposit solid sodium sulfanilanilide. To this suspension were added 6.1 g. of γ-propanesultone at 65°. Heating converted the mixture into a thick slurry, which was diluted with 100 ml. of ethanol and refluxed two hours. After cooling, by filtration, there was separated sodium 3-(p-(phenylsulfamoyl)anilino)propanesulfonate, water-soluble solid, analyzing 6.16% N. The sodium salt, on treatment with a 9:1 ethanol:84% sulfuric acid mixture, followed by filtration and evaporation, is converted to the corresponding acid.

Similarly, by the reaction of $N^1$-benzylsulfanilamide and δ-butanesultone, there is prepared 4-(p-(benzylsulfamoyl)anilino)-1-butanesulfonic acid.

Example 4

A 1% dispersion of the product of Example 1 was prepared by warming 100 mg. of the acid with 1 ml. of the surface active agent known to the trade as "Tween 20," and reputed to be a polyoxyethylene sorbitan monolaurate; to this mixture was added 9 ml. of water to make the said 1% dispersion. This stock solution was then made up to 300 ml. of a 100 p. p. m. solution, of which a portion was further diluted to make a 10 p. p. m. aqueous solution of the active compound.

The sand in which were potted three plants of 4- to 5-week old individually potted tomato plants, of the Bonny Best variety, each having four true leaves at least one and a half inches long, was treated with 30 ml. per pot of the 100 p. p. m. solution of the product of Example 1 for three successive days. On the fourth day the three plants plus a control, untreated tomato plant, were uprooted, about one-third of each plant root system was torn off, and the roots, after washing in water, were immersed in a suspension of approximately $10^8$ bud cells per ml. of a culture of *Fusarium oxysporum* f. *lycopersici* for 30 seconds. The plants were repotted in fresh sand and permitted to develop until the control showed marked disease symptoms. Analyses of the results of the test by evaluation of the vascular discoloration in the large vascular bundles between each node showed that the Fusarium wilt disease was completely eradicated on the plants treated with the product of Example 1; furthermore, the tomato plants were healthy and exhibited no sign that the solutions applied had any phytotoxic effect. Repetition of the test using the 10 p. p. m. concentration of the 3-(p-sulfamoylanilino)-1-propanesulfonic acid again gave complete control of the fungus, while the control plants treated similarly but without application of the sulfonic compound were badly diseased.

The present compounds may be usefully applied to combat fungus infestations either by applying them to infected crops, or by treating the plants in advance of an anticipated attack. To achieve even distribution of the very low concentrations of the new compounds which are actively parasiticidal, they may suitably be applied to plants in a carrier, the bulk of the fungicidal composition being composed of inert materials, such as liquids or dusts. Suitable solid inert carriers for application of the present fungicidal compositions are; for example, talc, bentonite, diatomaceous earth, etc. The new compounds being water soluble, aqueous solutions of the necessary concentration for application to plant foliage may readily be prepared. It has been found that particularly high fungicidal efficacy is obtained if the present compounds are applied to plant foliage as aqueous dispersions containing surface active agents. Examples of suitable surface active dispersing agents are long-chained alkylbenzenesulfonates, polyalkylene glycols, long-chained fatty alcohol sulfates, etc. The liquid compositions containing the present compounds may also have incorporated therein any of the usual agricultural emulsion and dispersion additives, i. e., stickers, spreaders, etc.

The present fungicidal compositions may be used alone, or in combination with other agricultural chemicals such as insecticides or other toxicants, or together with fertilizers, etc. They may be employed to combat fungus diseases such as cherry leaf spot, brown rot, fungus diseases of flowers, potato blight, sweet potato black rot, etc. Suitable concentrations for agricultural application are; for example, from one-half to 5 pounds per acre, though the rate of application will generally vary with the fungus being attacked; the compound, among those provided by the present invention, which is chosen for application; the temperature and weather conditions, etc. In choosing particular compounds, as disclosed by the present invention, for application, it may generally be considered that the compounds of lower molecular weight are usually more immediately effective, while the compounds of higher molecular weight may have more lasting effect. Thus, if desired, mixtures of various of the presently provided new fungicides may advantageously be applied; e. g., to infected crops.

Other modifications of the present invention will readily occur to those skilled in the art and it is intended that the present invention be limited only as indicated in the appended claims.

What is claimed is:

1. The process which comprises heating at a temperature in the range of from room temperature to below the decomposition point of the reaction mixture ingredients sulfanilamide with γ-propanesultone and separating from the resulting reaction product 3-(p-sulfamoylanilino)-1-propanesulfonic acid.

2. The process which comprises heating at a temperature in the range of from room temperature to below the decomposition point of the reaction mixture ingredients sulfathiazole with γ-propanesultone and separating from the resulting reaction product, 3(p-(2-thiazolylsulfamoyl)anilino)-1-propanesulfonic acid.

3. The method of combating fungus infestations on plants which comprises applying to the said plants at least about ½ pound per acre of 3-(p-sulfamoylanilino)-1-propanesulfonic acid.

4. The process which comprises heating at a temperature in the range of from room temperature to below the decomposition point of the reaction mixture ingredients a compound of the formula

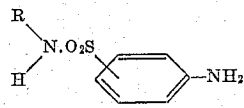

where R is selected from the class consisting of hydrogen and the thiazyl radical, with a sultone of the formula

where R' is a saturated straight-chain hydrocarbon radical containing from 3 to 4 carbon atoms, and R" is selected from the class consisting of hydrogen and the methyl radical, and separating from the resulting reaction product a compound of the formula

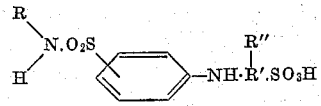

where R, R' and R" are as defined herein above.

5. The method of combating fungus infestations on plants which comprises applying to the said plants at least about ½ pound per acre of a compound of the formula

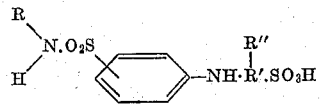

where R is selected from the class consisting of hydrogen and the thiazyl radical, R' is a saturated straight-chain hydrocarbon radical containing from 3 to 4 carbon atoms, and R" is selected from the class consisting of hydrogen and the methyl radical.

References Cited in the file of this patent

FOREIGN PATENTS

| | | |
|---|---|---|
| 816,988 | France | Aug. 21, 1937 |
| 907,892 | Germany | Mar. 24, 1954 |

OTHER REFERENCES

Northey: Sulphonamides and Allied Compounds, Reinhold Pub. Corp., N. Y., 1948, pages 108, 109, 164.